(No Model.)
L. J. CADWELL.
METHOD OF AND APPARATUS FOR DESICCATING EGGS, &c.
No. 294,849. Patented Mar. 11, 1884.
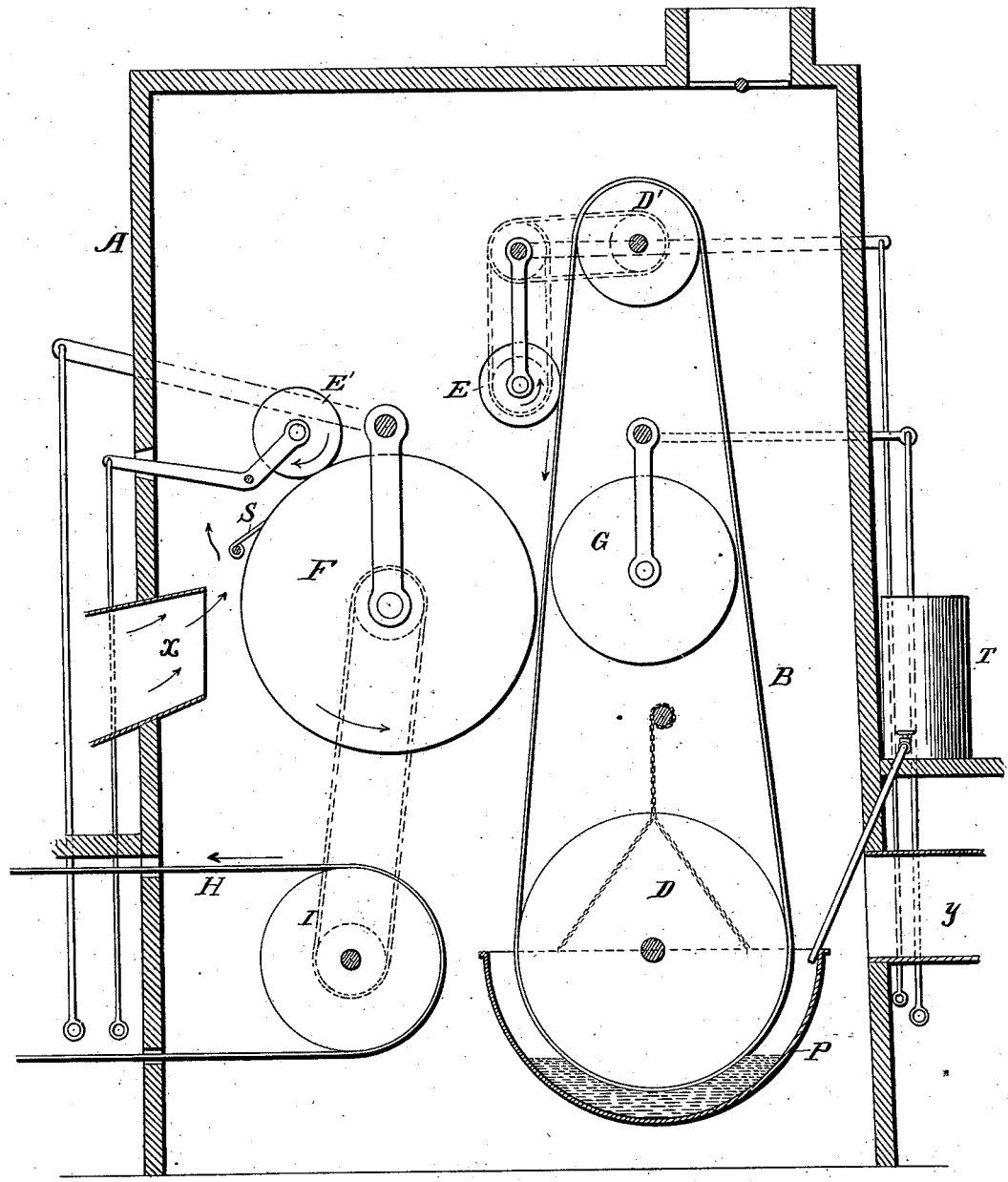

UNITED STATES PATENT OFFICE.

LYDIA J. CADWELL, OF CHICAGO, ILLINOIS.

METHOD OF AND APPARATUS FOR DESICCATING EGGS, &c.

SPECIFICATION forming part of Letters Patent No. 294,849, dated March 11, 1884.

Application filed January 8, 1884. (No model.)

*To all whom it may concern:*

Be it known that I, LYDIA JANE CADWELL, a citizen of the United States, and a resident of the city of Chicago, in the county of Cook and State of Illinois, have invented certain new and useful Improvements in Treating Eggs and Like Substances, of which the following is a specification.

My invention relates to desiccating eggs and other liquid materials, and in apparatus therefor, the same constituting improvements upon the process and apparatus described in Letters Patent No. 239,722, issued to me April 5, 1881, and having for their object to secure a more thorough mixture of the materials, a more homogeneous product, and facilitate and expedite the operations.

In the drawing the figure is a part sectional elevation of sufficient of an egg-drying apparatus to illustrate my invention.

The outer casing, A, has in it a carrier for the material to be dried. As shown, said carrier is a band, B, passing round the lower drum, D, and upper drum, D', which, with a movable pan, F', and tank T, are constructed and arranged in any suitable manner, but preferably correspond to the like parts illustrated and described in the Letters Patent issued to me as aforesaid. In connection with the traveling belt-carrier I also use a distintegrating-roller, E, which, by contact with the material upon the surface of the belt, crushes, agitates, and works and respreads the said material, thereby granulating or crystallizing the same, reducing it to a uniform consistence and insuring a more rapid desiccation. The carrier, whether a drum or a belt, as described, is revolved until a sufficient amount of material is thereon. The pan is then lowered, and the carrier moved until the material is in a viscid condition, as described in my aforesaid patent.

In place of allowing the roller E to be turned by the movement of the belt B, I prefer to impart a positive rotation to the roller E by a driving-belt, *b*, as shown, or otherwise, and in a direction the same as that in which the belt B travels, thereby insuring a more effective working and breaking up of the material.

At one side of the belt B revolves a second carrier, shown as consisting of a drum, F, and with- in the belt revolves another drum, G, the carrier F being situated with its edge opposite and at a short distance from the carrier B, so that by a lateral movement of the drum G the outer face of the belt-carrier will be brought in contact with the carrier-drum F. The carrier F is driven by a driving-belt, *c*, or otherwise, in a direction contrary to that in which the carrier B travels, the result being that the material carried by the belt B is transferred to the drum F, where it is further worked and dried by the contact of a disintegrating-roller, E', turning in the same direction as the drum. A knife or a series of knives or scrapers, S, is arranged near the periphery of carrier-drum F, so as to receive therefrom the thoroughly worked and dried material left upon the face of the drum after the action of the disintegrator E', the material uncovered by the knife falling upon a traveling belt, H, which conducts it to the drying-chamber for final drying. By this double working of the material, it is reduced to a more homogeneous condition, the albumen is thoroughly incorporated, a better granulation is secured, and the desiccation effected more rapidly.

It is most desirable to prevent too quick a hardening of the material upon the surface of the belt B, and it is also desirable to have the product as thoroughly dried as possible before it is deposited upon the carrier-belt H. I therefore direct the products of combustion or heated air from the furnace through a flue, *x*, first upon that portion of the product which is in the act of removal by the scrapers S, thereby drying the product, the gases being then diffused through the chamber, and acting more slowly upon the material carried by the belt B, and then passing to an outlet, *y*, below the inlet *x* on the opposite side. I thus apply a strong heat to that portion of the material which has been thoroughly worked, and in a nearly dry condition, and a diffused and reduced heat to the fresh portion of the material, which must be heated slowly, in order to prevent the albumen from being solidified before being thoroughly incorporated with the other portions.

In some instances the traveling belt H may be passed directly around the carrier-drum F, the knives S simply loosening the material upon the belt. I however prefer the arrangement shown and above described.

Any suitable means may be employed for driving the various drums or rollers, belts being shown in dotted lines, and the disposition of the drums within the drying-chamber may be varied according to circumstances.

It will be obvious that to secure a more thorough and effectual breaking up and disintegration of the films of material, the number of carriers is increased, two or more drums or carriers F being employed. By this means the material is fed continuously.

Without therefore limiting myself to the precise construction and arrangement in parts shown, I claim—

1. The within-described improvement in treating eggs and other liquid or semi-liquid substances, which consists in forming the same into a thin film and exposing it to heat while being crushed, agitated, and desiccated, then transferring this worked material to form another film, and again similarly treating it to more thoroughly desiccate it, and finally thoroughly drying the same, as set forth.

2. In an apparatus for treating eggs and other like substances, two carriers and working appliances, and openings arranged to convey heated gases from the furnace first to the carrier on which the material is last worked, and then to the first carrier, substantially as specified.

3. The combination, in a desiccating apparatus, of two or more carriers and two or more disintegrators, and means for bringing the first carrier, after the material is sufficiently worked, in contact with and transferring it to the second, substantially as specified.

4. The combination, with the carrier B, of a disintegrating-roll, and means for revolving the latter positively in the same direction as the carrier.

In testimony whereof I have signed my name to this specification in the presence of two subscribing witnesses.

LYDIA J. CADWELL.

Witnesses:
CHARLES E. FOSTER,
JOSEPHINE CAMPBELL.